United States Patent [19]

Juschenko et al.

[11] Patent Number: 5,004,885
[45] Date of Patent: Apr. 2, 1991

[54] APPARATUS FOR OVERHEAD SUBMERGED-ARC WELDING

[76] Inventors: Konstantin A. Juschenko, ulitsa Komandarma, Kameneva, 4a, kv. 115; Pavel A. Varenchuk, ulitsa Prazhskaya, 3, kv. 426; Valentin D. Kovalev, ulitsa Malo-Kitaevskaya, 58, kv. 2; Anatoly I. Chvertko, ulitsa Mechnikova, 18, kv. 86; Nikolai T. Privalov, ulitsa Prazhskaya, 3, kv. 118; Vladimir G. Kuzmenko, ulitsa Lomonosova, 29, kv. 94, all of Kiev, U.S.S.R.

[21] Appl. No.: 460,928
[22] PCT Filed: Dec. 14, 1988
[86] PCT No.: PCT/SU88/00259
§ 371 Date: Feb. 6, 1990
§ 102(e) Date: Feb. 6, 1990
[87] PCT Pub. No.: WO89/11942
PCT Pub. Date: Dec. 14, 1989

[30] Foreign Application Priority Data

Jun. 6, 1988 [SU] U.S.S.R. .............................. 4429060

[51] Int. Cl.$^5$ .............................................. B23K 9/18
[52] U.S. Cl. .............................................. 219/73.2
[58] Field of Search .............................. 219/73, 73.2

[56] References Cited

FOREIGN PATENT DOCUMENTS

| | | |
|---|---|---|
| 3430349 | 2/1986 | Fed. Rep. of Germany . |
| 3430371 | 2/1986 | Fed. Rep. of Germany . |
| 3430394 | 2/1986 | Fed. Rep. of Germany . |
| 1335395 | 9/1987 | U.S.S.R. . |
| 1348112 | 10/1987 | U.S.S.R. . |
| 1397218 | 5/1988 | U.S.S.R. . |
| 1397219 | 5/1988 | U.S.S.R. . |

*Primary Examiner*—Clifford C. Shaw
*Attorney, Agent, or Firm*—Lilling and Lilling

[57] ABSTRACT

An apparatus for overhead submerged-arc welding a hopper containing flux and accommodating a bowl having means for supplying flux and its pressing and having its open upper part facing towards a work being welded, a rear wall of the bowl in the welding direction being made in the form of a movable plate supported by a pivot pin extending perpendicularly with respect to its surface. Adjacent to a movable plate in the bowl is mounted a welding nozzle for supplying a consumable electrode and a forming means is provided above the brim of the open part of the bowl on a suspension supported by a pivot pin for cooperation with the movable plate and for oscillations in the longitudinal and transverse planes, and the hopper is suspended on the pivot pin of the suspension of the forming means. The pivot pin supporting the movable plate is mounted on a means for pressing an upper end face of the movable plate against the front end extremity of the underside of the forming means. Such construction of the apparatus during welding prevents accumulation and jamming of the flux in the bowl under the forming means, creates the optimum conditions for oscillations of the forming means and provides for automatic maintenance of preset pressures of the flux on different parts along a joint being welded.

The invention may be preferably used for welding longitudinal and rotatable annular joints.

2 Claims, 1 Drawing Sheet

APPARATUS FOR OVERHEAD SUBMERGED-ARC WELDING

BACKGROUND OF THE INVENTION

1. Field of the Invention

The invention relates to equipment for arc welding, and more specifically, it deals with an apparatus for overhead submerged-arc welding.

2. Description of the Related Art

A large number of operations are performed in the manufacture of welded structures with welding of rotatable annular joints of hollow products with a restricted access to joints being welded from the interior. Such joints include annular joints of closed vessels, annular joints of pipelines, tanks, casings, assembly welds, shell plating seams of ship hulls; longitudinal welds of large-area products which it is difficult to place to a position facilitating welding. Such joints include joints between difficult-to-position webs, segments, three-dimensional and planar sections and other members.

The overhead submerged-arc welding method is characterized by the fact that a consumable electrode and welding bath are turned at 180° in comparison with the downhand submerged-arc welding. Flux and electrode are supplied from bottom up, i.e. as though towards a ceiling. The electrode is supplied through compacted flux.

This is why this welding method will be referred to hereinbelow as overhead submerged-arc welding.

This welding method is referred to as the overhead submerged-arc welding also because arc is in the body of metal.

So called overhead welds are produced as a result of such welding.

Overhead welds may be of various types, e.g. penetration overhead welds and sealing overhead welds. There may also be one-pass overhead welds and other overhead welds.

The penetration overhead welds are the welds which are first to be produced in welding a joint and which are located in the top part of sections being welded, on the opposite side of the joint with respect to the electrode supply. Further welding of the joint, i.e. producing further welds, can be carried out by any appropriate known method, the electrode being supplied on the same side as was the case in producing the penetration overhead weld, e.g. producing inner penetration welds of rotatable annular joints of vessels, tanks, joints between bottom sections of shell plating of ships, and other structures.

The overhead submerged-arc welding of penetration welds mainly allows welding inside vessels in producing rotatable annular welds to be eliminated, and welding can also be avoided in confined spaces in producing straight welds of structures with an access on the side opposite to the ceiling.

The sealing overhead welds are the welds which are first to be produced in welding a joint and which are located in the bottom part of sections being welded on the joint side in the vicinity to the electrode supply. Further welding is carried out by any appropriate known method, the electrode being supplied on the opposite side of the joint as compared with overhead welding.

In practice, the penetration overhead welds are produced in welding annular and longitudinal joints of structures with a restricted access to joints being welded from the interior.

The sealing welds are produced in welding elongated longitudinal joints of difficult-to-position products such as plate structures made out of segments or other members.

The one-pass overhead welds are the welds produced in welding joints of a limited thickness located over the whole welded section. No further welding of the joint on either side is required.

Many problems arise in producing sealing and one-pass welds in forming the surface of the finished weld.

The metal in the welding bath formed during arcing by fusion of the metal being welded, electrode material and welding flux is held by the crust of partly melted flux and by forming means. Forming means may be of various configuration and size and may be, e.g. in the form of plates, backings, bars, sliders and other members.

Flux is positively pressed against the welding spot from bottom, and as flux is consumed, its stock is continually replenished. Flux may be supplied for forming the top part of the weld either on the bottom side through the gap between the edges of welded members or from top by any appropriate known method so as to form a filled flux layer. Special forming backings or flux holders may also be used.

Special problems arise in welding joints of large-size cylindrical or like products such as ship hulls and boiler units where especially high quality of welds is required and where the product should be rotated about its axis during welding, and also in welding large-size planar members which it is difficult to place to a position facilitating welding.

Known in the art is an apparatus for overhead submerged-arc welding (SU,A,1348111), comprising a hopper containing flux and accommodating a bowl and a welding nozzle for a consumable electrode extending through the hopper and bowl.

The hopper supports a welding head. The hopper is pivotally mounted on a suspension for rotation about a pivot pin of the suspension. The same pivot pin supporting the hopper also supports a forming means and a copying member in the form of a copying wheel. The apparatus has means for turning the hopper about its support pivot pin and a means for pressing the forming means with the copying member against a work being welded. The support pivot pin of the hopper is aligned with the upper end face of a rear wall of the bowl. The forming means is mounted in such a manner that the main part thereof is received in the bowl above the brim of an outlet port thereof facing towards the work being welded. The pivot pin supporting the hopper is mounted on a mounting arm provided on a carriage which has the means for pressing the forming means with the copying member against the work being welded, comprising a power actuator for moving the carriage in the direction towards the work being welded.

The support pivot pin is mounted on the hopper in an offset position with respect to a means for supplying flux and pressing it against the work being welded so that the hopper supported by this pivot pin forms a double-arm lever, one arm of the lever supporting the means for supplying flux and pressing it against the work being welded and the other arm being connected to the means for turning the hopper about the support pivot pin. The means for turning the hopper is in the form of a power actuator pivotally connected to the hopper and carriage.

The hopper suspension is mounted on a driven trolley which is adapted to move in the welding direction.

The construction of the prior art apparatus makes it possible to vary both absolute values of flux pressure in the bowl and force with which the forming means is pressed against the work being welded and the ratio therebetween.

This apparatus allows welding to be carried out with the desired weld formation on either side thereof in a broad range of process capabilities with a wide range of welded structures.

However, as the forming means and the copying wheel in this apparatus are mounted on one and the same pivot pin aligned with the upper end face of the rear wall of the bowl which is stationary, the forming means is pressed away from the work in cases of substantial convexities of the joint being welded on the underside thereof. This results in a substantial change in position of the axis of oscillations of the hopper and copying wheel with respect to the surface of the work being welded, hence, in an abrupt change in preset flux pressures in the bowl at various points of formation of the welding bath (upstream of the arc, in the zone of the arc and welding bath, and at the point of solidification of the welding bath), i.e. in a disruption of welding as a whole and in impaired quality of welded joints.

In case of a substantial concavity of a joint being welded on the underside of the work, the forming means is separated therefrom, and a substantial additional space is formed between the working face of the forming means and the work so that welding is also disrupted.

In addition, the provision of the main part of the forming means inside the bowl, in the area of strongly compacted flux filling it during welding, hampers oscillations of the forming means with respect to its pivot pin thus hampering copying of the surface of the work and disrupting conditions for maintaining a constant preset flux pressure in the bowl, hence, resulting in a lower welding quality as a whole.

Also known in the art is an apparatus for overhead submerged-arc welding (DE,C, 3430394), comprising a hopper containing flux and accommodating a bowl having inlet and outlet ports. The inlet port of the bowl communicates with a supply pipe which house an auger connected to a drive. The outlet port of the bowl faces towards a work being welded. A welding nozzle for a consumable electrode extends through the hopper and the bowl. The hopper supports a welding head and an auger drive.

The hopper is pivotally mounted on a mounting arm for rotation about its pivot pin.

The pivot pin supporting the hopper is mounted on the mounting arm which is movable in the direction towards the work being welded. This mounting arm also supports a forming means and a copying member which are attached thereto by means of pivot pins and suspensions.

The forming means is mounted for oscillations in its transverse and longitudinal planes. A transverse bar is provided at the front edge of the forming means located adjacent to the welding nozzle on the bottom face of the forming means, the transverse bar cooperating with the rear wall of the bowl during welding.

The copying member engages the surface of the work being welded during welding. The support pivot pin of the forming means is in the form of a point-like abutment at the end of a double-arm lever having its fulcrum attached to a mounting arm, the other arm of the lever being connected to another power actuator pivotally connected to the mounting arm. The copying member is in the form of a copying wheel and is mounted on the pivot pin supporting the hopper. The pivot pin supporting the forming means in another embodiment of the apparatus is in the form of a point-like abutment at the end of a mounting arm adjacent to the welding nozzle. In this embodiment of the apparatus, the copying member is in the form of projections on the surface of the forming means, the pivot pin supporting the hopper is located on the side of the forming means remote from the nozzle, and the hopper has a means for moving it with respect to its support pivot pin.

In this apparatus, the mounting arm is mounted on a carriage which has a drive for moving it and is mounted on a driven trolley for moving the whole apparatus in the welding direction.

This apparatus allows permanent contact between the forming means and copying member on the one hand and the work being welded on the other hand to be ensured during welding with various errors of assembly before welding and of geometry of the joint being welded (e.g. misalignment of plate edges, convexity and concavity, undulations, clearances, and the like).

Therefore, upon any change in position of the forming means during welding caused by an admissible change in profile of the surface of the work being welded at point of their contact the possibility of the forming means acting upon position of the hopper containing flux is prevented. This facility prevents the hopper from performing undesired oscillations upon changes in profile of the work surface and stabilizes welding parameters such as flux backing thickness and flux pressure in the welding zone.

The flux backing is an area of a compacted compressed flux layer which has a preset pressure distributed over the whole area of the flux backing and which is located between the top part of the bowl facing towards the work being welded and the surface of the work being welded to exert a local pressure upon the surface of the joint being welded in the welding zone.

This construction of the apparatus provides conditions for a smooth copying of the surface of the joint being welded by the forming means without jerks and shakes which is necessary for maintaining stable preset values of flux pressure acting upon the welding bath and upon zones in which the welding bath is formed along the joint being welded.

The construction of the prior art apparatus also provides conditions for a smooth copying of the surface of the joint being welded by the forming means and for adjusting position of the hopper with respect to the work being welded which is necessary for carrying out welding of products of different configurations.

In this apparatus, a change in position of the forming means during welding which occurs because of errors of geometry and assembly of the joint being welded does not cause a change in position of the pivot pin supporting the hopper with respect to the surface of the work being welded.

In welding with such an apparatus, owing to the creating and maintenance at a constant level of preset flux pressures at various points along the joint being welded (upstream of the arc, in the arc and welding bath zone, and in the zone downstream of the welding bath and up to the formed weld), the possibility of automatic conduct of welding of overhead welds and production of high-quality welded joints is ensured.

This apparatus also ensures high-quality overhead welding in a broad range of process capabilities.

However, in welding products with large assembly errors of joints before welding or with local changes in geometry of joints being welded (e.g. in welding thin-walled bottles, receivers, and the like), when the forming means substantially changes its position with respect to the work, flux can be jammed in the space between the rear wall of the bowl and the bar at the bottom of the forming means. This jamming of flux results in the bowl being pressed away, together with the hopper, from the surface of the work being welded; an additional space is formed between the bowl and work, hence, the preset flux pressure in the zone of the electrode and at various points along the joint being welded is changed thus bringing about disruption of welding and lower welding quality over a broad range of process conditions.

In addition, the pivot pin supporting the hopper and the pivot pin supporting the forming means in this apparatus are spaced from each other which, in welding the abovementioned products having errors of geometry and assembly of joints, causes a substantial relative movement of the forming means with the transverse bar located at its bottom and the rear wall of the bowl so as to intensity jamming of flux in the clearance between the rear wall of the bowl and the transverse bar and result in fluctuations of the preset pressure of flux in the bowl and in a lower welding quality.

SUMMARY OF THE INVENTION

The main object of the present invention is to provide an apparatus for overhead submerged- arc welding in which construction of the rear wall of the bowl and its fixation and corresponding location of the pivot pin supporting the forming means and the pivot pin supporting the hopper containing the flux during welding would allow free oscillations of the forming means on the pivot pin relative its longitudinal and transverse surfaces required to maintain a preset pressure of flux on the portions of the works having different geometry and errors of assembly, as well as crystallization of the weld metal with significant offsets of the edges of welded joints to produce high-quality overhead welds with a required formation of a weld at both sides over a broad range of process capabilities (as during bottom welding).

The above object is accomplished by an apparatus for overhead submerged-arc welding, comprising a suspended pivotally mounted rotatable hopper containing flux and accommodating a bowl having means for supplying flux and pressing it against a work being welded, the open top part of the bowl facing towards the work being welded, a welding nozzle for supplying a consumable electrode extending through the bowl and mounted adjacent to a rear wall thereof in the welding direction, and a forming means mounted above the brim of the open part of the bowl on a suspension supported by a pivot pin, the forming means being mounted on a suspension for cooperation with the rear wall of the bowl and for oscillations in its own longitudinal and transverse planes. According to the invention, the rear wall of the bowl is in the form of a movable plate mounted on a pivot pin extending perpendicularly to its surface and mounted on a means for pressing the upper end face of the movable plate against the front end extremity of the underside of the forming means, the hopper containing flux being supported by the pivot pin supporting the suspension of the forming means.

This construction of the apparatus for overhead submerged-arc welding, in which the rear wall of the bowl is in the form of a movable plate mounted on a pivot pin which is perpendicular with respect to its surface and mounted on the means for pressing the upper end face of the movable plate against the front end extremity of the underside of the forming means, and in which the pivot pin supporting the forming means suspension is the pivot pin supporting the hopper containing flux, prevents flux from accumulating and being jammed in the bowl under the forming means and ensures free oscillations of the forming means on the suspension in the longitudinal and transverse planes thereof, the forming means movement with respect to the rear wall of the bowl being prevented, whereby optimum conditions for oscillations of the forming means are provided in welding products with errors of assembly of joints, especially with large alternating misalignments of plate edges, errors of geometry, e.g. in welding bottom plates of railway tanks, receivers, boiler and other products so that automatic maintenance of preset flux pressures can be ensured at various points along the joint being welded and high-quality welds can be produced in welding intricately profiled structures, especially those with long joints having errors of geometry and assembly before welding.

The means for pressing preferably comprises a double-arm lever mounted on the bowl, the pivot pin supporting the movable plate being attached to one end of the lever, the other end of the double-arm lever being biased by an adjustable spring, a retainable means for adjusting the stroke of the movable spring being provided on the double-arm lever, the fulcrum of the double-arm lever extending in parallel with the axis of oscillations of the movable plate.

This construction of the means for pressing the movable plate ensures the necessary adjustable pressure of the upper end face of the movable plate, which forms the rear wall of the bowl, against the front end extremity of the underside of the forming means and provides for a distribution of forces of pressure of the forming means and bowl against the work being welded necessary for the overhead submerged-arc welding, whereby the overhead submerged-arc welding can be carried out under optimum process conditions so as to substantially enhance quality of welded joints.

The apparatus features enhanced quality performance in carrying out overhead submerged-arc welding owing to the maintenance of substantially all welding parameters at a stable level.

BRIEF DESCRIPTION OF THE DRAWINGS

The invention will now be described with reference to a specific embodiment thereof illustrated in the accompanying drawings, in which.

DESCRIPTION OF THE PREFERRED EMBODIMENT

Figure 1:
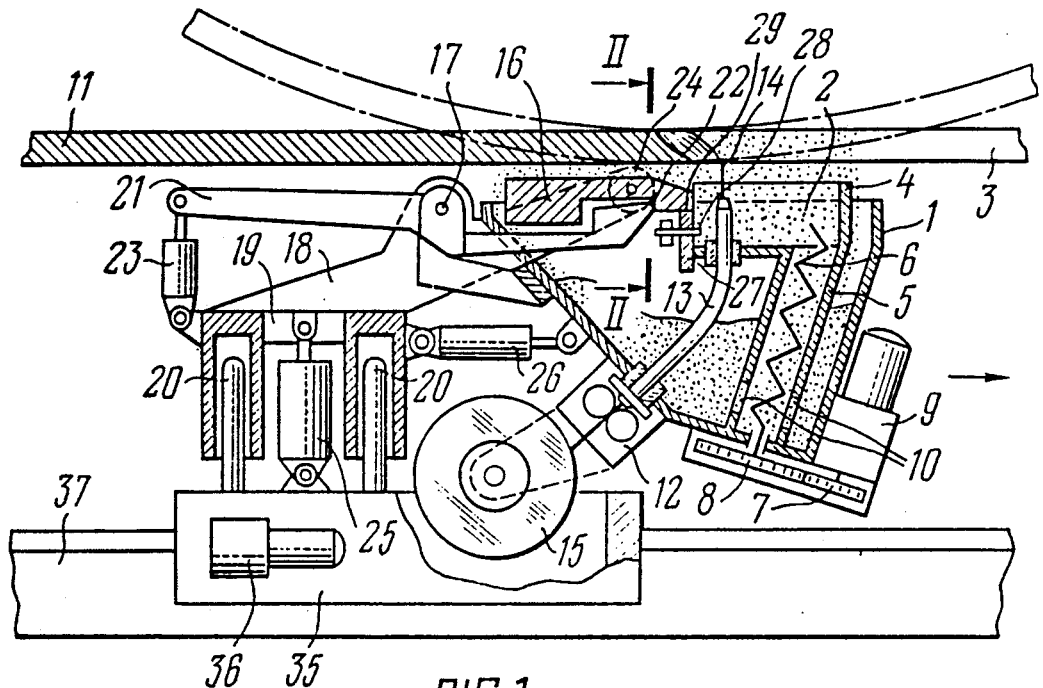
FIG. 1 schematically shows a longitudinal section view of an apparatus for overhead submerged-arc welding according to the invention.

The reference is now made to the accompanying drawings which show a specific embodiment of an apparatus for overhead submerged-arc welding according to the invention.

An apparatus for overhead submerged-arc welding comprises a hopper 1 (FIG. 1) containing flux 2. The hopper 1 accommodates means for supplying flux 2 and for pressing it against a work 3 being welded, and a bowl 4 having inlet and outlet ports is provided in the upper part of the hopper 1.

The inlet port of the bowl 4 is connected to a supply pipe 5 housing an auger 6 which is connected, by means of spur gears 7, 8, to a drive 9. The outlet port of the bowl 4 faces towards the work 3 being welded. The pipe 5 with the auger 6 form means for supplying flux 2 and pressing it against the work 3 being welded.

The supply of flux 2 from the hopper 1 to the joint being welded is carried out in the following manner.

During rotation of the auger 6 by means of the drive 9, flux 2 is supplied through a port 10 in the bottom part of the supply pipe 5, through the supply pipe 5 to the bowl 4.

The bowl 4 is designed for forming a flux backing and for exerting therethrough a local pressure upon an area extending along the joint being welded upstream the arc with respect to finished weld 11 as well as along the welding bath on the underside of the work 3 being welded.

The hopper 1 has a welding head 12 having a welding nozzle 13 for supplying a consumable electrode 14, e.g. from a coil 15 of electrode wire by a supply means of the welding head 12.

The nozzle 13 is mounted in the hopper 1 in such a manner as to extend through the bowl, and its end extending in the bowl 4 is offset with respect to the supply pipe 5.

This offset position of the nozzle 13 with respect to the supply pipe 5 is made because non-uniform distribution of preset flux pressure 2 upon the work 3 being welded occurs in the zone of supply of flux 2 from the hopper 1 to the bowl 4. At the same time, to ensure stability of parameters of overhead submerged-arc welding, it is necessary to have uniform pressure and pressure distribution of flux 2 in the arcing zone adjacent to the electrode 14.

This uniform distribution of pressure in the vicinity to the electrode 14 is achieved owing to the fact that flux backing is pressed against the work 3 being welded at a constant preset pressure, and uniform distribution of this pressure over the welding zone occurs owing to friction forces developed upon relative movement of the work 3 being welded and the welding apparatus.

Surplus flux that did not participate in welding overflows through the bowl 4 and spills freely back to the hopper 1.

Circulation of flux 2 from the hopper 1 to the welding spot is thereby provided thus enhancing cost-effectiveness of welding.

A forming means 16 is provided adjacent to the welding nozzle 13 in a spaced relation to the electrode 14. The forming means 16 is in the form of a bar made of a heat-resistant heat conducting material with a profile of the face cooperating with the flux backing and the work 3 being welded which ensures the build-up of necessary pressures in the welding zone and formation of the finished weld 11. The bar may be cooled, e.g. with water or air.

For producing welded joints with a preset configuration of weld reinforcement on the underside of the work, i.e. on the ceiling side, the forming means 16 may be made, e.g. in the form of a slider. In this case the slider is adapted for a direct contact with the weld being formed. The provision of the forming means 16 in the form of a slider enhances quality of the surface of the finished weld 11.

Configuration and profile of such a contact face of the forming means 16 cooperating with the work during welding are chosen mainly in accordance with the joint type, desired shape and dimensions of the finished weld, grade and type of fluxes used and welding conditions.

The suspended pivotally mounted rotatable hopper 1 containing flux 2 is supported by a pivot pin 17 of a suspension of the forming means 16.

According to the invention, the pivot pin 17 supporting the hopper 1 and suspension of the forming means 16 is mounted in a mounting arm 18 of a carriage 19 mounted on guide rods 20.

The welding nozzle 13 extends through the bowl 4 and is located adjacent to the rear wall of the bowl in the welding direction.

The forming means 16 is mounted above the brim of the open part of the bowl 4 on a suspension which is supported by the pivot pin 17 and is mounted on the suspension for cooperation with the rear wall of the bowl 4 and for oscillations in the longitudinal and transverse planes of the forming means.

The pivot pin 17 supporting the hopper 1 containing flux 2 and the suspension of the forming means 16 should ensure oscillations of the hopper 1 and suspension of the forming means 16 in the plane of the joint being welded.

The suspension of the forming means 16 is in the form of a double-arm lever 21. One end of the double-arm lever 21 supports the pivot pin of the suspension of the forming means 16 which is in the form of a point-like abutment 22.

The forming means 16 is constructed and mounted on the abutment 22 in such a manner as to ensure its self-positioning with respect to the surface of the work 3 being welded.

The other arm of the double-arm lever 21 is connected to a power actuator 23 (e.g., with an air or hydraulic cylinder). The power actuator 23 may be in the form of spring means, weights and counterweights, and the like.

The power actuator 23 is pivotally mounted on the mounting arm 18.

This construction of the suspension of the forming means 16 allows the surface of the work 3 being welded to be copied by the forming means 16 in an especially accurate and smooth manner. This suspension ensures compensation for friction forces developed during cooperation of the surface of the work 3 being welded with the forming means 16 so as to provide conditions for a stable maintenance of preset overhead welding parameters.

A copying member 24, e.g. in the form of a copying wheel is provided at the end of the mounting arm 18 by means of a pivot pin. The copying member 24 is designed for ensuring a constant distance from the surface of the work 3 being welded to the pivot pin supporting the hopper 1 containing flux 2 and the suspension of the forming means 16.

This constant distance is necessary to stabilize pressures exerted by the flux backing upon the surface of the work 13 being welded thus stabilizing all parameters of overhead submerged-arc welding.

The carriage 19 is adapted to move in the direction towards the work 3 being welded, and for that purpose it is installed on appropriate guide members, e.g. in the form of the guide rods 20.

The carriage 19 is provided with a means for pressing the copying member 24 against the work 3 being welded, which is in the form of a power actuator 25 (e.g., an air or hydraulic cylinder) for moving the carriage 19 in the direction towards the work 3 being welded.

In order to ensure necessary pressures of the flux backing upon the work 3 being welded, the apparatus is provided with a means for turning the hopper 1 about its support pivot pin 17.

The means for turning the hopper 1 about its support pivot pin 17 is made in the form of a power actuator 26 (e.g., an air or hydraulic cylinder), which is pivotally connected to the hopper 1 and to the carriage 19.

The pivot pin 17 may be mounted on the hopper 1 in an offset position with respect to the means for supplying flux 2 and pressing it against the work 3 being welded.

In this case, the hopper 1 is preferably connected to the means for turning the hopper 1 about its support pivot pin 17 on the opposite side.

The power actuator 26 may also be of any other appropriate known type, e.g. in the form of spring means or a weight attached to the hopper 1.

This construction of the hopper 1 makes it possible to provide a highly sensitive system reacting to changes in profile of the surface of the work 3 being welded and automatically maintaining the necessary preset pressures of flux 2 in the welding zone.

Supporting the double-arm lever 21 of the suspension of the forming means 16 on the abutment 22, arranging the pivot pin 17 supporting the hopper 1 and supporting the lever on the mounting arm 18 of the carriage 19, and the operative connection of the carriage 19 through the mounting arm 18 to the copying member 24 and the work 3 being welded allow position of the double-arm lever 21 with respect to the work 3 being welded to be stabilized with deviations from regular geometry of the products and in welding products of irregular geometry.

This stabilization of position of the double-arm lever 21 ensures, during welding, constant preset angles of cooperation of the forming means 16 with the surface of the work 3 being welded thereby maintaining a constant distributed pressures of flux 2 at various points along the joint being welded at the welding spot.

Figure 2:
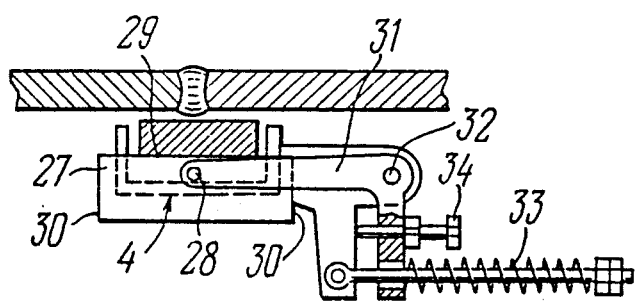
FIG. 2 is a sectional view taken along line II—II in FIG. 1.

In the apparatus according to the invention, the rear wall of the bowl 4 is made in the form of a movable plate 27 (FIGS. 1,2). The plate 27 is mounted on a pivot pin 28 extending perpendicularly with respect to its surface. The pivot pin 28 is mounted on a means for pressing an upper end face 29 of the movable plate 27 against the front end extremity of the underside of the forming means 16 (FIG. 1).

The underside of the front end extremity of the forming means 16 may be flat, and the upper end face of the movable plate 27 engageable with this flat surface of the forming means 16 may be straight, with rounded edges to facilitate cooperation.

The rear wall of the bowl 4 may be in the form of the planar movable plate 27 (FIGS. 1,2) mounted on the pivot pin 28 extending perpendicularly with respect to the plane of the plate 27 and equally spaced from its edge 30 (FIG. 2.)

The provision of the rear wall of the bowl 4 in the form of the movable plate 27 mounted on the pivot pin 28 extending perpendicularly with respect to its surface and installed on the means for pressing the upper end face 29 of the movable plate 27 against the front end extremity of the underside of the forming means 16 (FIG. 1) and supporting the hopper 1 and the suspension of the forming means 16 on one and the same pivot pin prevent flux 2 from being jammed in the bowl 4 under the forming means 16 during welding and ensure optimum conditions for unobstructed oscillations of the forming means 16 on the suspension in the longitudinal and transverse planes of the forming means.

In addition, with such a construction, movement of the forming means 16 with respect to the rear wall of the bowl 4 is prevented so that optimum conditions are provided for oscillations of the forming means 16 and for solidification of the weld metal in welding products with errors of assembly and geometry of joints, e.g. in welding annular joints of boilers, receivers, railway tanks and longitudinal joints and seams of bottom sections of ship hulls and other products, whereby automatic maintenance of preset pressures of flux 2 at various points along the joint being welded is ensured and high-quality welds 11 can be produced in welding intricately profiled works 3, especially with long joints having errors of geometry and assembly before welding.

The means for pressing the movable plate preferably comprises a double-arm lever 31 (FIG. 2) mounted on the bowl 4 and pivotally secured to a pivot pin 32.

The pivot pin 28 for oscillations of the movable plate 27 is mounted at one end of the double-arm lever 31.

The other end of the lever 31 is biased by an adjustable spring 33. The lever 31 also has a retainable means 34 for adjusting the stroke of the movable plate 27 which is engageable with a projections of the bowl 4. The pivot pin 32 of the double-arm lever 31 extends in parallel with the pivot pin 28 supporting the movable plate 27.

This construction of the means for pressing the movable plate 27 ensures the necessary adjustable pressure of the upper end face 29 of the movable plate 27 forming the rear wall of the bowl 4 against the front end extremity of the underside of the forming means 16 (FIG. 1) and ensures a distribution of forces pressing the forming means 16 and the bowl 4 against the work being welded necessary for the overhead submerged-arc welding so as to allow the overhead submerged-arc welding to be carried out under optimum process conditions thereby substantially enhancing quality of welded joints.

For moving the apparatus in the welding direction, it is provided with a driven trolley 35 to which the guide rods 20 for movement of the carriage 19 are rigidly secured and on which the power actuator 25 for moving the carriage 19 is pivotally mounted. The driven trolley 35 has its own drive 36.

The driven trolley 35 is necessary for moving the apparatus along a joint being welded. The driven trolley 35 is designed for moving the whole apparatus along the joint being welded which is necessary in welding long longitudinal joints of difficult-to-position planar sections or plate structures as well as other products, especially in carrying out the overhead welding.

The advantages of the abovedescribed apparatus will be especially remarkable in producing penetration, sealing and one-pass overhead welds.

The abovedescribed apparatus for overhead submerged-arc welding functions in the following manner.

Flux 2 is loaded in the hopper 2 before welding. Composition of flux 2 used for the overhead welding is chosen mainly in accordance with the material of welded structures, geometry of joints and welding conditions.

The fluxes used mainly consist of $SiO_2$, MnO, CaO, MgO, $Al_2O_3$, $CaF_2$ and other components which ensure stable arcing, fusion of the work metal, protection of the welding bath and formation of the finished weld.

Before welding, the apparatus for overhead submerged-arc welding is placed under the work 3 being welded. Two options are available in doing this.

In welding long straight joints of large-size products, the apparatus is generally moved along the joint being welded.

In welding annular joints of rotatable structures, the apparatus remains stationary, and the structure is caused to rotate about its own axis in such a manner that the joint being welded remains in the electrode zone.

When the apparatus is placed under the work 3 being welded, the power actuator 25 of the carriage 19 adjusted for welding a given product is switched on to press the copying member 24 against the work 3 being welded through the intermediary of the carriage 19 mounted on the guide rods 20 and mounting arm 18.

This pressure of the copying member 24 is effected during the entire joint welding time period. The copying member 24 is in permanent contact with the surface of the work 3 being welded.

Then the power actuator 23 of the suspension of the forming means 16 and the power actuator 26 for turning the hopper, adjusted for welding of a given product, are switched on simultaneously. The forming means 16 is pressed against, and self-positioned with respect to the joint being welded, and the open upper part of the bowl facing towards the work 3 being welded is pressed against the work 3 being welded.

This pressure of the forming means 16 by means of the double-arm lever 21 supported by the pivot pin 17 is carried out until the upper face of the forming means comes in touch with the outer surface of the work 3 being welded and the forming means 16 is self-positioned with respect to this surface of the joint being welded.

During this self-positioning of the forming means 16 mounted on the abutment 22 of the double-arm lever 21, the forming means oscillates in its own longitudinal and transverse planes in response to changes in geometry and profile of the joint being welded.

At the same time, the bowl 4 is positioned with respect to the surface of the work 3 being welded. This positioning of the bowl 4 occurs under the action of the power actuator 26 turning the bowl about the pivot pin 17 supporting the hopper 1 and mounted on the mounting arm 18.

The forming means 16 acts by the underside of its front end extremity upon the upper end face 29 of the movable plate 27 mounted on the pivot pin 28 located midway between the edges of the movable plate 27 (FIG. 2). The upper end face 29 of the movable plate 27 is intimately pressed against the forming means 16 (FIG. 1) by means for pressing it and remains in permanent contact therewith during welding. Jamming of flux 2 and its spillage back to the bowl are thereby prevented.

The pivot pin 28 supporting the movable plate 27 is permanently biased by the double-arm lever 31 (FIG. 2) mounted on the pivot pin 32 and biased by the spring 33.

Before the welding, the force of the spring 33 is adjusted in accordance with the desired welding conditions by adjusting its length by means of nuts provided on a threaded portion of a rod on which the spring in installed.

Position of the movable plate 27 with respect to the brim of the open part of the bowl 4 is also adjusted before welding by rotating the means 34 for adjusting the stroke of the movable plate 27.

Then the drive 9 of the auger 6 (FIG. 1) is switched on after its adjustment for welding of a given work 3, and the drive imparts rotation to the auger 6 through the spur gears 7,8. Rotation of the auger results in flux 2 being supplied through the ports 10 in the bottom part of the supply pipe 5 and through the pipe 5 to the bowl 4. Flux 2 supplied to the bowl acts upon the surface of the joint being welded at the welding spot and forms a flux backing.

Subsequently the drive 36 of the trolley 35 is switched on (it is switched on in welding longitudinal joints, and in welding annular joints, the drive 36 is not switched on, and a rotary drive for rotating the work is switched on, which is not shown in the drawing), and the trolley moves along a track 37.

Voltage is then applied to the consumable electrode 14, the supply means of the welding head 12 is switched on for supplying the consumable electrode 14 from the coil 15 through the welding nozzle 13 to the joint being welded. The joint is welded. The finished weld is produced.

The accompanying drawings show an embodiment for overhead arc welding of longitudinal joints with the moving apparatus for overhead arc welding.

When the apparatus according to the invention moves along the joint being welded, the forming means 16, mounted on the abutment 22 at the end of the double-arm lever 21 for oscillations in its own longitudinal and transverse planes, cooperates with the surface of the work 3 being welded, the forming means 16 copies the work profile and, depending on nature of changes in this profile, acts upon the movable plate 27 and the means for pressing the upper end face 29 thereof against the front end extremity of the underside of the forming means 16. The spring 33 (FIG. 2) ensures a constant preset pressure of the upper end face 29 of the movable plate 27 against the forming means 16 (FIG. 1).

The fact that the forming means 16 is supported by the abutment 22 of the double-arm lever 21 for oscillations in the longitudinal and transverse planes of the forming means and suspension of the forming means ensure copying of the surface of the work 3 being welded by the forming means 16, and the provision of the rear wall of the bowl 4 in the form of the movable plate 27, its support on the bowl and the provision of the means for pressing the upper end face 29 of the movable plate 27 against the front-end extremity of the underside of the forming means 16 allow a highly sensitive system to be provided which reacts to changes in profile of the surface of the work 3 being welded, ensures unobstructed oscillations of the forming means 16 on its suspension and prevents displacement of the forming means 16 with respect to the rear wall of the bowl 4 so as to automatically maintain preset flux pressures in the welding zone and enhance quality of welded joints.

With such a contact between the forming means 16 and bowl 4 with the work 3 being welded (through the intermediary of the flux backing) it is possible to ensure production of overhead welds with a better quality of their surface.

The finished weld 11 in such cases is produced with accurately preset dimensions and features smooth transitions between the weld metal and base metal of the work 3 being welded even with ultimate admissible errors of assembly and geometry of joints and has a good external appearance and high surface finish.

The apparatus according to the invention for overhead submerged-arc welding makes it possible to carry out automatic overhead welding of joints with enhanced quality in forming both sides of the welds and with a much higher productivity of the overhead welding in comparison with prior art apparatuses, the overhead welds produced by such an apparatus having a better quality and featuring preset dimensions of weld reinforcement on either side.

To the most advantage the apparatus may be used for overhead submerged-arc welding for producing backup and single-pass welds in cases when an increased quality of surface formation is required, both from outer and inner sides of a joint being welded (for example, annular joints of reservoirs, pipelines, vessels, casings and boilers or elongated longitudinal welds of large size planar and three-dimensional sections, widths, segments et al).

We claim:

1. An apparatus for overhead submerged-arc welding, comprising: a suspended pivotally mounted rotatable hopper containing flux and accommodating a bowl having means for supplying flux and pressing it against a work being welded, an open top part of the bowl facing towards the work being welded, a welding nozzle for supplying a consumable electrode extending through the bowl and mounted adjacent to a rear wall of the bowl relative to the welding direction, and a forming means mounted above a brim of the open top part of the bowl on a suspension supported by a first pivot pin, the forming means being mounted on said suspension for cooperation with the rear wall of the bowl relative to the welding direction, and for movement in longitudinal and transverse planes, the rear wall of the bowl relative to the welding direction being in the form of a movable plate mounted on a second pivot pin extending perpendicularly to a surface of the rear wall of the bowl relative to the welding direction, and mounted on a means for pressing an upper end face of the movable plate against a front end extremity of the underside of the forming means, the hopper containing flux being supported by the first pivot pin supporting the suspension of the forming means.

2. An apparatus according to claim 1, wherein the pressing means comprises a double-arm lever mounted on the bowl, one end of the double-arm lever supporting the second pivot pin for movement of the movable plate and the other end of the double-arm lever being biased by an adjustable spring, a retainable means for adjusting a stroke of the movable plate being provided on the double-arm lever, a third pivot pin for movement of the double-arm lever extending in parallel with the second pivot pin for movement of the movable plate.

* * * * *